E. LEMERCIER.
Shoe-Supporting Mechanisms while Riveting the Soles and Uppers.
No. 5,952. Reissued June 30, 1874.
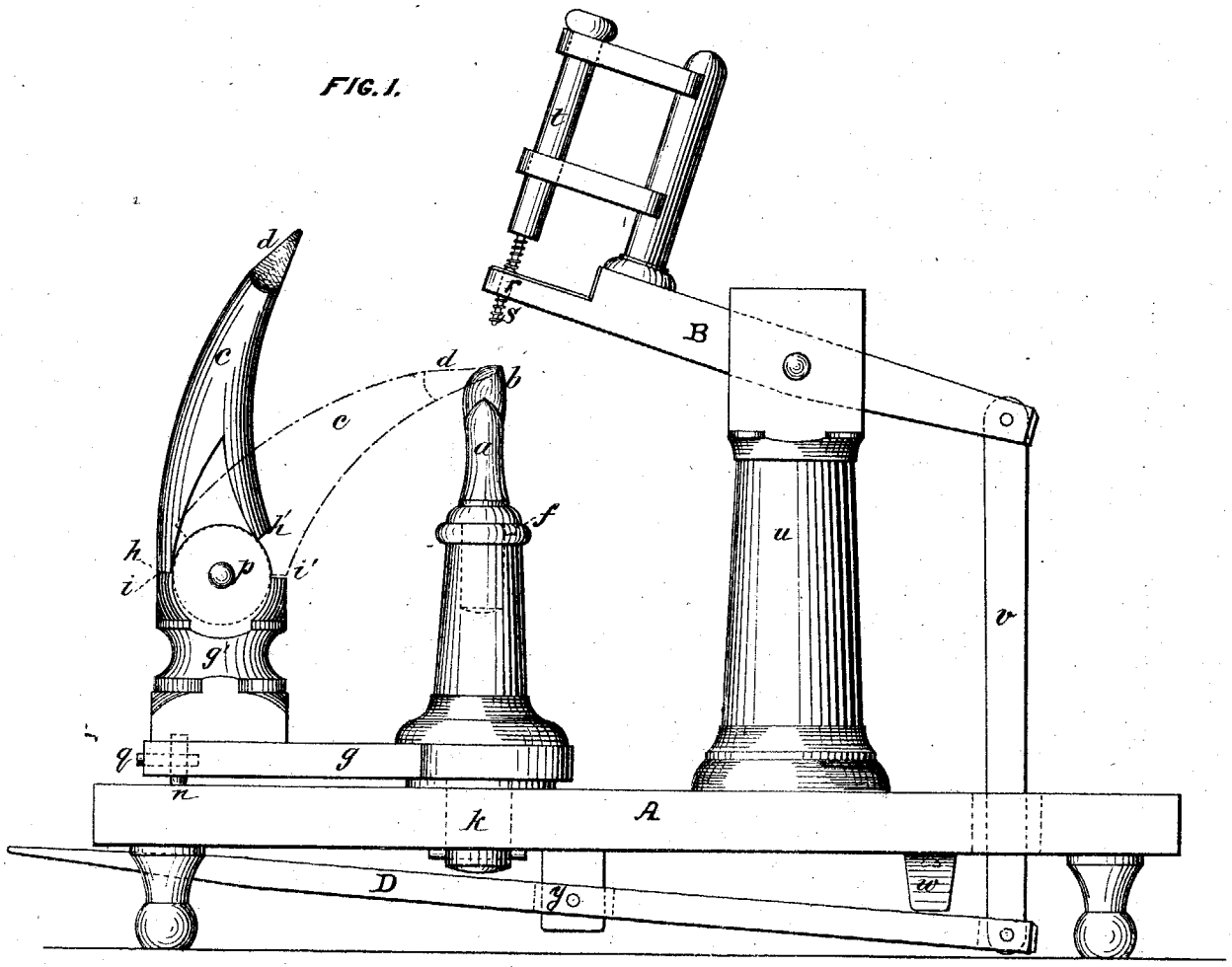
WITNESSES:
Benjamin C. Pole
T. C. Smith
E. LEMERCIER, INVENTOR.
John Mundell
Edwin T. Partridge } ASSIGNEES:
BY Johnson and Johnson
ATTORNEYS.
AM. PHOTO-LITHOGRAPHIC Co. N. Y. (OSBORNE'S PROCESS.)

UNITED STATES PATENT OFFICE.

EUGENE LEMERCIER, OF PARIS, FRANCE, ASSIGNOR, BY MESNE ASSIGNMENTS, TO JOHN MUNDELL AND EDWIN F. PARTRIDGE, OF PHILADELPHIA, PENNSYLVANIA.

IMPROVEMENT IN BOOT AND SHOE SUPPORTING MECHANISMS WHILE UNITING THE SOLES AND UPPERS.

Specification forming part of Letters Patent No. 37,886, dated March 10, 1863; reissue No. 5,952, dated June 30, 1874; application filed April 18, 1874.

*To all whom it may concern:*

Be it known that EUGENE LEMERCIER, of Paris, France, did invent a new and Improved Apparatus for Holding and Supporting Shoes and Boots in the Act of Having their Soles and Heels Screwed on by Screwing-Machines; and that the following is a full and exact description thereof, reference being had to the accompanying drawings, in which—

Figure 1 represents a side elevation of the improved apparatus, with so much of the screwing-machine as will illustrate its location and operation in connection therewith.

This invention relates to an apparatus for screwing the soles and heels of boots and shoes by means of screwing-machines, but without the use of lasts and last-holders, which have hitherto been indispensable in connection with said screwing-machines, and which are a source of great outlay and delay in working.

The general requirements accomplished by this apparatus are that the boot or shoe shall easily be passed on it, and the inside of the sole or heel shall rest on small metallic surfaces, whereon the screw from the machine will rivet the same, as on the iron-shod last now in use; moreover, the apparatus shall be movable, and so shaped as to allow the operator to screw all around the sole and heel. For this purpose I divide the apparatus into two distinct but combined resting-surfaces. One of these is intended for the heel, and is, therefore, quite vertical, having the shape of a rest or anvil. The other part, for screwing the sole, has the shape of a tongue or beak-iron, and both of these parts carry a steel plate, or are hardened at their bearing or resting surfaces.

The said EUGENE LEMERCIER, as administrator of the estate of Louis Jules Sellier, deceased, applied for Letters Patent of the United States on the 2d October, 1862, for a machine for screwing on the soles and heels of boots and shoes, for which Letters Patent No. 37,201, and dated the 16th December, 1862, were duly granted and issued to Amasa Bemis Howe, of the city of New York, as assignee, to whom also was assigned and issued the patent for the herein-described invention of the said LEMERCIER, which was designed to be used with the said screwing-machine of the said Sellier, deceased, as shown by the accompanying drawing, which represents so much of the screwing-machine as will illustrate this invention and its application to said screwing-machine, as follows:

Upon a table or stand, A, is mounted a column or support, *u*, upon which is pivoted a lever, B, upon the front end of which, in suitable bearings or supports, is carried the spindle *t*, through or by which the screw or screw-wire *s*, which fastens the sole and heel to the boot or shoe, is issued or conducted to the work and against the anvil, said screw-wire passing through a pressing-nose, *r*, on the end of said lever, for a purpose to be presently described. To the rear of the lever B is attached the upper end of a connecting rod or bar, *v*, the lower end of which is attached to a treadle, D, pivoted to the table or stand, as at *y*, and extending forward so as to be within the ready and convenient access of the operator of the machine. A spring, *w*, is applied to the treadle, so that when freed from the pressure upon it it will raise up the lever, spindle, and screw-wire, as shown in the drawings, so that the shoe may be removed, replaced, or turned, as the case may be. When the treadle is pressed down by the foot of the operator the lever B, together with the screw-wire *s* and spindle *t*, is brought down until the nose *r* of the lever presses upon the sole or heel of the boot or shoe, and firmly holds it in position, and against the raising action of the screw. The front end of the lever B forms the pressing-nose *r*, and, when depressed, presses the sole down upon the horn, as shown in the drawings, just where the screw is being fed in, and holds the several layers of the material upon the point of the horn, which resists solidly the pressure from the screw when arrested by said horn. The horn therefore supports the work to be screwed, and serves as an anvil on which the screw is received as it is fed in, and by which it is clinched.

So much of the machine is is hereinabove described is substantially shown in the patent of the 16th December, 1862, hereinabove referred to, and is sufficient to illustrate how the invention of the said LEMERCIER may be applied to and used with that machine.

The invention of the said LEMERCIER consists, first, in the combination of the movable vertical and beak-shaped anvils or supports, so that either may be moved into or out of action, as may be required. It further consists in arranging the beak-shaped anvil on a frame or arm that turns around the axis of the vertical anvil, so that the face of either of the anvils that, for the time being, may be in use, shall be in the line of the axis of the screw that is being fed in. It further consists in an anvil for heel-work removable from its socket, in combination with a pivoted and swinging horn for the sole-work, and capable of occupying, by its supporting-point, the position vacated by the supporting-point of the heel-anvil. It further consists in the pivoted swinging horn supported to resist the pressing action of the screw presenting and holding mechanism by means of abutting shoulders. It further consists in combining, with a screw-presenting and pressing mechanism for screwing on the soles and heels of boots and shoes, a horn or beak-iron, which serves as a support for the work, and as an anvil on which the inserted screws are, or may be, riveted. It further consists in the combination, with a screw-presenting mechanism and with the horn or beak-iron, of an arrangement by which the horn or beak-iron may be swung around by the operator with the boot or shoe, or the latter turned thereon, the point of the horn being of such size that it may be entered well into the toe of the shoe, and the shoe or boot being presented sole uppermost and turned on and with the horn, as required.

To enable others skilled in the art to make, use, and apply the invention of said LEMERCIER, the following description is given:

*a* is a small anvil or rest, having a steel-hardened face, *b*. *c* is a beak-iron or arm, (shown in its lowered position by dotted lines in the drawing;) *d*, steel-hardened face of the same. The little rest *a* is not a fixture, but merely insertable in the column *e*, and is prevented from turning therein by a pin, *f*. When it is desired to screw the sole the little rest or anvil *a* is taken out; the beak-iron *c* is then lowered down into the position shown in dotted lines, and the vamp passed on the same. In this position of the horn it is subjected to considerable pressure as the screw is being fed in and while clinching it against the steel points. To resist this pressure the inner side of the horn has a shoulder, *h'* which abuts upon a fixed shoulder, *i'*, on a standard, *g'*, of the swiveling support *g*. The beak-iron is mounted on the general frame *g* by means of a pivot, *p*, but this arrangement may be varied. When the heel has to be screwed on, the beak-iron or tongue *c* is turned up about the pin *p* until the points *h i* touch and form abutting shoulders to hold the horn up, and the anvil is then put in its place. In order to apply the apparatus to sole and heel screwing machines, it is necessary that the center of the surfaces *b* and *d*, when in place, and hence the axis of the column *e*, which is the center of motion, as explained hereafter, should coincide with the axis of the screw *s*, issuing from the machine under which the apparatus is placed. In order to allow the apparatus to be turned about, as required by the nature of the work, the column *e* is centered on a pivot, *k*, which runs in a central bearing fixed on the table by means of wood-screws or bolts. At the outer end of the frame *g* is provided a roller or caster, *n*, which rolls on the table, and by means of this contrivance the apparatus may be turned around to any extent required. *q* is the spindle or axis of the roller *n*.

What is claimed under this patent as the invention of the said LEMERCIER is—

1. The combination of the movable, vertical, and beak-shaped anvils or supports, so that either may be moved into or out of action, as the case may require, substantially as and for the purpose set forth.

2. The anvil *d*, arranged on a frame or arm, *g*, that turns around the axis of the other anvil, *a*, so that the face of either of the anvils that is for the time being in use shall be in the line of the axis of the screw that is being fed in, substantially as described.

3. An anvil for heel-work, made removable from its socket, in combination with a pivoted and swinging horn for the sole, capable of being brought into the position vacated by the heel-anvil.

4. The pivoted swinging beak-iron or anvil, supported by the abutting shoulders *h' i'*, to resist the pressing action of the screw as it is fed in, and the pressure of the work-holding device, substantially as described.

5. A work-supporting beak-iron or anvil, substantially such as described, in combination with mechanism for presenting screws or screw-wire, and a pressing device which operates to hold the work while the uniting-screws are inserted in the soles and uppers of boots and shoes.

6. In combination with mechanism for presenting the screws to unite the sole and upper of a boot or shoe and a pressing holding device for the work, a horizontally-rotatable horn or beak-iron, for the support and presentation of the work to the pressing device.

JOHN MUNDELL.
EDWIN F. PARTRIDGE.

Witnesses:
JNO. A. BELL,
B. K. ESLER.